E. F. NICHOLS.
CIRCUIT CLOSER.
APPLICATION FILED OCT. 3, 1919.
1,376,967.
Patented May 3, 1921.
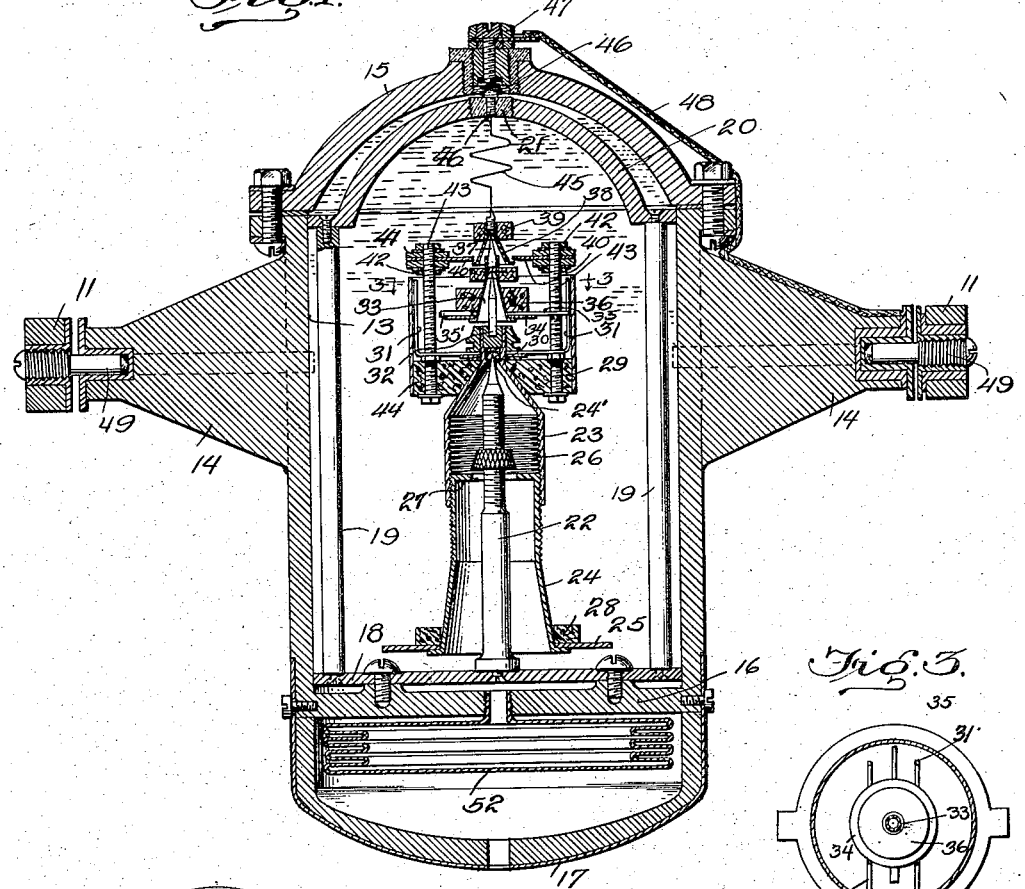
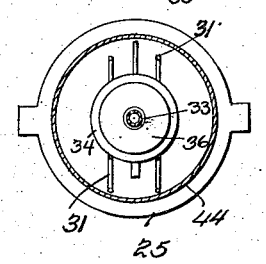
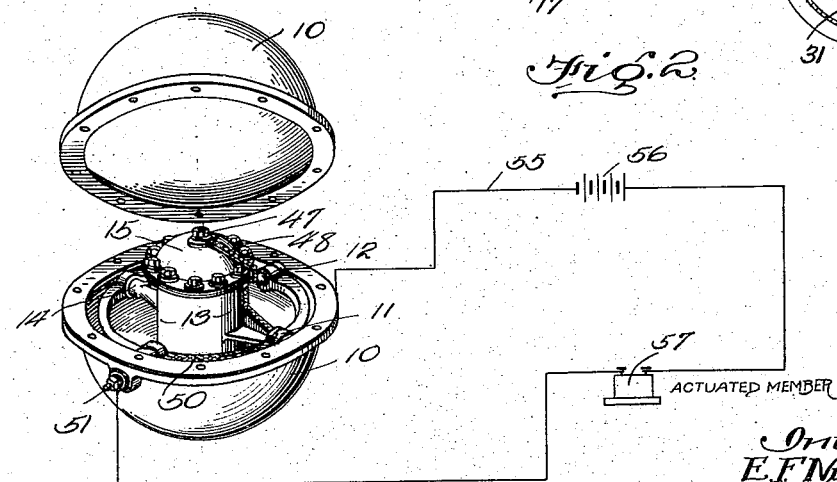
Inventor
E. F. Nichols
By
Attorney

UNITED STATES PATENT OFFICE.

ERNEST FOX NICHOLS, OF NEW HAVEN, CONNECTICUT.

CIRCUIT-CLOSER.

1,376,967.   Specification of Letters Patent.   Patented May 3, 1921.

Original application filed November 27, 1918, Serial No. 264,454. Divided and this application filed October 3, 1919. Serial No. 328,303.

*To all whom it may concern:*

Be it known that I, ERNEST FOX NICHOLS, a citizen of the United States, residing at New Haven, Connecticut, have invented new and useful Improvements in Circuit-Closers, of which the following is a specification and is to be considered as a division of my co-pending application.

This invention relates to circuit closers and particularly magnetic responsive devices for closing a circuit which is actuated by changes in the intensity of a magnetic field acting thereon, these changes being due primarily to local disturbances caused by magnetic bodies of various kinds moving relatively to the field acting upon the instrument.

It may be stated that when two magnetized needles, disks or rings are pivoted independently, one vertically above the other, each magnet is acted upon by two forces; first, the horizontal component of the earth's magnetic field tending to set the magnetic axes of the magnets in the magnetic meridian with north seeking pole magnetic north; second, the repulsive force between like magnetic poles tending to set the north pole of one magnet over the south pole of the other. The horizontal component of the earth's magnetic field is within broad limits independent of the distance between the magnets while the force due to repulsion of like poles varies rapidly with this distance of separation. If we begin with the magnets far enough apart so that their repulsive force is insignificant, both magnets will set themselves in the magnetic meridian with their north seeking poles magnetic north. As the distance separating the magnets is diminished and the repulsive force thereby increased, the north seeking poles of the two magnets are deviated on opposite sides from the magnetic meridian, and the two magnets form an angle, the magnitude of which corresponds to the position of balance of the forces acting. If the two magnets have different magnetic moments, the magnetic axis of the weaker magnet in the equilibrium position forms the larger angle with the magnetic meridian. As the vertical distance separating the centers of the magnets is steadily diminished, the angle between the magnetic axes of the two magnets increases from zero to 180°. When the axes of the two magnets form an angle between those limiting values, any variation in the horizontal intensity of the earth's magnetic field, due to a local magnetic disturbance, will increase or diminish the angle of separation. If the force due to the local disturbance is in the same direction as the horizontal component of the earth's magnetic force, the angle of separation will be diminished. If the local force is opposed to that of the horizontal component of the earth's magnetic field, the angle will increase. An angle of 90° between the two needles represents the position of greatest magnetic and mechanical stability for the system.

In the present disclosure I have shown my device as being employed for actuating any suitable actuated member such as an indicating means, a circuit closer or other instrumentality according to the use to which the invention is applied, for my improved device may be used generally to detect or determine the position of proximity of any magnetic body relative thereto to bring about certain results on the actuated member associated therewith.

With this understanding of the broader aspect of the invention in mind, it may be stated that the present invention is designed to embody such features of construction in a simple and magnetic responsive device which will be entirely reliable and efficient in operation.

It is also an object of the present invention to provide a magnetic responsive device adapted to withstand the rough handling of transportation or planting when used in the water where it may be effected by currents and storms without danger of disturbing the mechanism or in any way injuring or changing the adjustments and magnetic and mechanical values of any of its component parts.

Other objects will be in part obvious from the annexed drawings, and in part indicated in connection therewith by the following analysis of this invention.

This invention accordingly consists in the features of the design, construction, combination of parts and in the unique relations of the members and in the relative proportioning and disposition thereof; all as more completely outlined herein.

Drawings depicting a preferred form have been annexed as part of this disclosure, and in such drawings, like characters of reference denote corresponding parts throughout the views, of which:—

Figure 1 is a vertical sectional view of the operating mechanism of the device.

Fig. 2 is a perspective view with the upper part of the housing removed and showing a part of the circuit diagrammatically.

Fig. 3 is a sectional view taken substantially along the line 3—3, Fig. 1, certain parts being omitted for the sake of clearness.

The circuit closure or magnetic responsive device which is the principal part of the present invention is applicable to various uses and any form of non-magnetic casing may be employed. The casing as herein shown comprises generally a two-part spherical part or housing shell 10, of any suitable non-magnetic material, preferably brass, aluminium, or copper; the gimbal ring 11 pivoted in the shell by means of the trunnions 12; and a casing 13 mounted in trunnions 14 transversely to the pivots 12 of the gimbal ring. The parts are suitably counterbalanced to keep a normal horizontal position at all times regardless of the roll of the mine while being launched or after it is submerged due to the action of water currents, eddies, and waves.

The casing 13 which is more clearly shown in vertical section in Fig. 1, is of general cylindrical shape having trunnions 14 in the gimbal ring, as shown and is provided with a removable cover 15 and a false bottom 16. Connected to the bottom of the casing is a hollow lead block 17 which serves as a counterweight to keep the casing in a vertical position. The casing is preferably made of aluminum or other light and non-magnetic material, and is adapted to house the magnetic responsive mechanism, as shown. This mechanism is carried by a non-magnetic base plate 18 mounted on the false bottom 16 of the casing. Arising from the base plate 18 are two or more upwardly projecting rods or other standards 19 carrying an arched or semicircular shaped member 20 having a plug 21 of insulating material at its top, this plug being apertured to receive a terminal, hereinafter described. Extending upwardly from the central part of the base plate 18 is a main pivot post 22, which at its upper end terminates in a metallic pivot point, on which the entire system of magnetic needles is carried. Pivotally carried by the post 22 is an inverted thimble composed of two cylindrically-shaped members 23 and 24 preferably formed of aluminum, or other suitably light non-magnetic material, and adjustably secured together by means of a threaded connection or by a sliding or telescoping joint. The upper part of the member 23 is of conical shape and is adapted to coact with the top of the post 22. The apex of this cone is apertured and a metallic cup jewel 24' inserted which provides a hard polished bearing surface for the pivot point on 22 and at the same time insures electrical contact between 22 and 23, and other metallic parts not electrically insulated therefrom. The lower end of the lower member 24 is provided with a circumferential flange upon which rests a main ring-shaped magnet 25 with projecting rectangular pole pieces as shown in Fig. 3 but, of course, these pole pieces may be omitted. Upon the post 22 is threaded for adjustable movement a nut 26, and the member 24 has at its upper end a flange 27, which is brought into engagement with the nut when the device is turned upside down so that the thimble can not fall away from the post 22.

The entire mechanism in the casing 13 is immersed in any suitable fluid, kerosene, for instance, for the purpose of damping out all sudden or oscillatory motions of the magnetic system and reducing the effect of any shock from without in causing injury or violent motions of the delicate parts within and thus preventing accidental contact between the members, hereinafter described. The fluid also serves the purpose of acting upon suitable counterbalancing floats 28 and 29 secured to the bottom and top, respectively, of the thimble, thereby to reduce to a minimum the pressure and friction due to pressure of the thimble and parts carried thereby upon the pivot point of the post 22.

The upper part of the thimble is provided with a threaded bushing 30, in which are mounted two contact arms 31 spaced apart any suitable distance and extending parallel to each other across the upper surface of the float 29. It will be noted that the opposite ends of each of these contact arms are bent upward and extend equal distances from the center of the float, so that the entire mass is accurately balanced about the axis of the thimble. The distance separating these two contacts 31 controls the sensibility of the circuit closer, in that if the contacts are relatively close together, the movement of the secondary magnet, hereinafter described, need not be great to cause contact with one of the arms and the magnetic responsive device requiring thus a smaller magnetic disturbance to cause contact will have a greater radius of effective action, while an increase of the distance between the arms will require a greater movement of the secondary magnet.

The bushing 30 at the top of the thimble carries a metallic jewel bearing above which is an insulating plug, in which latter a second pivot 32 is fastened. This pivot carries a conical member 33 provided with a second ring magnet 34 bearing a contact arm 35. The member 35' is employed as counterpoise for the arm 35. A float 36 is associated with the cap 33 thereby to increase its buoyancy and reduce the friction between the pivot point 32 and its bearing to a minimum. The metallic contact arm 35 carried around by magnet 34 is normally positioned midway between the two contact arms 31, and when affected by a magnetic body is swung to one side or the other, according to the polarity of the affecting magnetic body.

The cap 33 carries a third pivot point 37, upon which rests a conical cap 38 provided with a metallic jewel bearing, a float 39 and a lateral circumferential flange at its lower end adapted to coact with a guard washer 40 carried between cork disks 41, adjustably secured by the nuts 42 upon threaded studs 43, passing through the float 29. It will be seen from this description and the drawings that the entire mechanism may be turned upside down, and while the pivots and jewel bearings will then separate slightly all the movable parts will return at once to normal position when the mechanism is again righted.

Carried by the float 29 and surrounding the mechanism carried thereby, is a cylindrical sleeve 44 which serves to prevent movement of the immersion liquid external to the sleeve from affecting the secondary magnet 34 and the parts carried thereby. With this construction, while currents may be set up in the liquid within the casing 13 by lateral or rotational movement of the entire device due to waves, eddies or currents in the stream in which it is planted, these liquid motions cannot be communicated to the parts within the sleeve 44.

The top cap 38 is connected electrically by means of a very light spiral flexible wire 45 to a terminal 46 extending through the plug 21 in the arch 20. The circuit is completed through a spiral spring 46', and insulated contact member 47 carried by the top of the casing 13, and a wire 48 passing along one of the trunnions 14 and electrically connected to a pin 49 insulated from the trunnion 14 and the gimbal ring 11. A wire 50, as clearly shown in Fig. 2, passes along a quadrant of the gimbal ring to an insulated binding post 51 carried by a shell 10.

In the lead block 17 is a sylphon 52 communicating with the interior of the casing 13, and this sylphon serves the purpose of permitting expansion and contraction of the flotation fluid within the casing due to changes in temperatures. However, this sylphon may be omitted inasmuch as the entire shell 10 is also filled with the same, and by leaving a suitable space, or air pocket, at the top of the liquid in the shell 10 and a capillary hole in casing 13 the expansion and contraction of the fluid can be taken care of without affecting the normal operation of the device.

The liquid filling the shell 10 serves the additional two-fold purposes of preventing shocks from being transmitted to the casing 13 and the parts therein and of damping out rapidly any oscillations of the casing 13 upon its gimbal trunnions.

After the parts of the mechanism herein described are assembled as shown in Fig. 1, the interior of the casing 13 and shell 10 are filled with a flotation fluid such as kerosene and the shell otherwise disposed or positioned according to the use to which it is to be put. Suitable wiring 55, battery 56 and actuated member 57 are connected and the device is ready for use. From Fig. 3 it will be seen that one of the wires 55 of the circuit is connected to bind post 51 and the other wire is directly connected to one of the bolts securing the two parts of the shell together.

From the above it will be seen that on the relative approach to the present device of a magnetic body an effect will be produced upon the magnets 25 and 34 which may be of equal or different magnetic moments therefore causing a relative rotation of one magnet with respect to the other which will bring the contacts 35 and 31 in equal engagement. As soon as this contact is made, the circuit is closed through the battery to actuate the actuated member which, as previously stated, may be any suitable electrically controlled device such as a galvanometer indicator or detonator.

It is, of course, understood that the contact arm 35 is connected to one side of the battery through the cap 33, pivot point 37, cap 38, wire 45, terminal 46, spring 46', plug 47 and the wire 48, while contact arms 31 are connected to the other side of the battery through the bushing 30, pivot point 22, plate 18, the walls of the casing 13, the trunnion 14 thereof, gimbal ring 11 and shell 10.

The entire system of magnets is carried by the skeleton frame, formed of the base plate 18, rods 19, and the arch 20, and this is of particular advantage as it facilitates the operation of assembling the parts, in that the parts of the mechanism may be brought together upon the base plate 18, and then after the parts are assembled and adjusted, the skeleton frame, together with the parts carried thereby, may be inserted through the top of the casing 13, and then the cover 15 of the casing clamped into place. The casing is filled with the liquid by pouring the latter through the opening which receives the screw 47.

While for the sake of convenience of representation the poles of the small magnet 34 are shown in Fig. 1 as normally being in the same vertical plane as the poles of the larger magnet 25, in actual practice the magnetic axes of the two magnets are at right angles, as clearly shown in Fig. 3. When the magnets are in this position, the greatest magnetic and mechanical stability for the system is obtained.

From the foregoing description and the drawings, it will be noted that the entire magnetic system is supported upon a single pivot, and this in addition to the gimbals, insures the maintenance of the system on a vertical axis and the holding of the magnets in horizontal planes. All mechanical disturbances, such as violent explosions in close proximity to the magnetic responsive device reach the system of magnets through but one point, namely, the pivot point of the post 22, and consequently suitable adjustment of the centers of gravity and buoyancy makes it possible to guard against outside motions disturbing the movable parts of the system. It will be seen from Fig. 1 that the pivot point of the post 22 on which the entire system of magnets is supported is at the intersection of the gimbal axes; that is to say, it is in alinement with the pins 49 on which the casing 13 is trunnioned and also in line with the trunnions 12 on which the gimbal ring 11 is pivoted. It will be understood that with this arrangement, when the casing 13 is rotated from an upright to an inclined position by water currents, eddies, or the like, the pivot point of the post 22 being at the center of the gimbal system, will remain substantially stationary and therefore the system of magnets will not be disturbed to any appreciable extent. Should the casing 13 become inclined at an angle to the perpendicular, the post 22 would of course be also inclined but the pivot point of the post would remain, as stated, substantially stationary and the thimble 23, having considerable freedom of rotation in a vertical as well as a horizontal plane together with the system of magnets carried thereby, would remain substantially vertical.

By immersing the parts of the magnetic system in a fluid, and providing means for floating of the parts, pivot friction is reduced to a minimum, damping out of mechanical vibrations is obtained, and damage to pivots and jewels by sudden shock is guarded against. Each separate assembly or units of parts of the magnet system is provided with separate and independent flotation means so that each part is maintained at all times, and irrespective of any rolling movement of housing 10, in a horizontal position. The floats have large surfaces and the friction between the surfaces of these floats and the fluid in which they are immersed aids in damping the movement of the magnets.

Since but a single pivot support for the system of magnets is provided, there being no bearing for the upper end of this system, the cap or terminal unit 38 is provided, this cap being connected to the fixed terminal by means of the flexible wire 45 to complete the electrical circuit through the system of magnets. When relative rotation occurs between the unit carrying the magnet 34 and the casing 13, no torques are transmitted to the magnet 34 as the cap 38 is freely pivoted on the pivot member 37 and takes care of all torques set up in the wire 45. The flexible wire 45 may be of spiral or other serpentine form so that it may be extended to permit relative rectilinear movements between the casing 13 and the system of magnets.

In accordance with present invention, the buoyancy provided by the float members is increased until each unit of the magnetic system is as near the specific gravity of the immersion fluid as restricting conditions permit, that is to say, the specific gravity of each of these units is but slightly greater than the specific gravity of the immersion fluid. The center of buoyancy of each of the units of the system is near the center of gravity of the respective units, and the center of buoyancy of the magnetic system, taken as a whole, is as near the center of gravity of the entire system as will insure the system remaining in an upright position. The center of buoyancy of the system is preferably immediately above the center of gravity of the system. Since enough flotation is added to the buoyancy of each unit of the system to render its specific gravity only slightly greater than the specific gravity of the immersion fluid, the fluid and the magnetic system will move substantially in unison; that is to say, if the casing 13 together with the immersion fluid therein, is subjected to any rectilinear accelerated movement, the system of magnets will not tend to lag behind nor move forward more rapidly than the immersion fluid itself. This provision is especially effective in protecting the magnet system in whole and in part from being disturbed by sudden shocks or impulsive accelerations imposed upon the shell 10 and casing 13 from without. By constructing the system so that the center of buoyancy is slightly above, but as near to the center of gravity as will insure the members remaining in an upright position, the position of the meta-centers are such that the system is always stable.

Without further analysis, the foregoing will sufficiently reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

What I claim is:

1. In a magnetic responsive device, a plurality of independently pivoted magnetic units having angular movements in any plane, a fluid in which said units are immersed, and a buoyancy member associated with each unit.

2. In a magnetic responsive device, a pivot, a unit pivoted on said pivot and having angular movement in any plane, a second pivot carried by said first unit, and in axial alinement with said first pivot, a second unit pivoted on said first pivot, a fluid in which said units are immersed, and separate buoyancy means for each unit.

3. In a magnetic responsive device, a plurality of independently pivoted magnetic units, a fluid in which said units are immersed, and a buoyancy member associated with each unit, the buoyancy of each of said units being such that its specific gravity is but slightly greater than the specific gravity of the immersion fluid.

4. In a magnetic responsive device, a plurality of independently pivoted magnetic units having angular movement in any plane, a fluid in which said units are immersed, and a buoyancy member associated with each unit, the center of buoyancy of the system of magnetic units being no farther above the center of gravity of said units than is necessary to insure the system remaining in upright position.

5. In a magnetic responsive device, a unit pivoted on a pivot, and having a second pivot which in its normal position is in axial alinement with said first pivot, a second unit pivoted on said first pivot, a fluid in which said units are immersed, and separate buoyancy means for each unit, the specific gravity of each of said units being but slightly greater than the specific gravity of the immersion fluid and the centers of buoyancy of each of said units as well as the whole system of units combined being slightly above but as near the centers of gravity of each unit or said system of units combined as will insure the system remaining in an upright position.

6. In a magnetic responsive device, a chamber, a pair of magnets each on its own pivot and free to rotate independently of the other, said magnets being arranged one above the other, a fluid in which said magnets are immersed, and a buoyancy member associated with each of said magnets.

7. In a magnetic responsive device, a pivot and a plurality of superimposed units each having a pivot in axial alinement with said first pivot for supporting the next succeeding unit, a fluid in which said units are immersed, and a separate buoyancy member for each of said units.

8. In a magnetic responsive device, a pivot, a unit pivoted on said first pivot and having a magnet and also a second pivot in axial alinement with said first pivot, a second unit pivoted on said second pivot and having a magnet and a pivot, a terminal unit pivoted on said last pivot, a flexible conducting wire leading from said terminal unit to a fixed point, a fluid in which said units are immersed and a buoyancy member on each unit.

9. In a magnetic responsive device, a plurality of superimposed units each having a pivot for supporting the next succeeding unit, a single pivot for supporting the entire system of units, and a separate buoyancy means for each unit.

10. In a magnetic responsive device, a unit having a magnet and a pivot, a second unit pivoted on said pivot and having a magnet, a single pivot point for supporting said units, a fluid immersing said units, and buoyancy means for each of said units.

11. In a magnetic responsive device, a plurality of superimposed units each having a pivot for supporting the next succeeding unit, a single pivot for supporting the entire system of units, and a separate buoyancy means for each unit, the specific gravity of each of said units being but slightly greater than the specific gravity of the immersion fluid and the center of buoyancy of the entire system of units being no farther above the center of gravity of the system than is necessary to insure the system remaining in an upright position.

12. In a magnetic responsive device, a gimbal system, a plurality of superimposed units carried by said system each having a pivot for supporting the next succeeding unit, a single pivot for supporting the entire system of units and being at the intersection of the axes of said gimbal system, and a separate buoyancy means for each unit.

13. In a magnetic responsive device, a gimbal system, a unit having a magnet and a pivot, a second unit pivoted on said pivot and having a magnet, and a single pivot point for supporting said units and being at the intersection of the axes of said gimbal system, and buoyancy means for each of said units, the specific gravity of each of said units being but slightly greater than the specific gravity of the immersion fluid and the center of buoyancy of the entire system of units being no farther above the center of gravity of the system than is necessary to insure the system remaining in an upright position.

14. In a magnetic responsive device, a plurality of independently pivoted units, a fluid in which said units are immersed, means for each unit tending to float the same, and means for preventing disarrangement of the units when the device is turned upside down.

15. In a magnetic responsive device, a pivot, a unit pivoted on said pivot and having a second pivot in axial alinement with said first pivot, a second unit pivoted on said second pivot, a fluid in which said units are immersed, a buoyancy member for each of said units, and means for preventing disarrangement of the units when the parts are turned upside down.

16. In a magnetic responsive device, a casing, a pivot post, an adjustable thimble pivoted on said post, a magnet carried by said thimble, a buoyancy member and a pivot post carried by said thimble, a cap pivoted on said second pivot and having a magnet and a buoyancy member, a pivot post carried by said cap, a cone-shaped member carried by said last mentioned pivot post and having a buoyancy member, and means carried by the buoyancy member on said thimble for preventing the removal of said cap.

17. In a magnetic responsive device, a casing, a pivot post, a thimble pivoted on said post, a magnet carried by said thimble, a second pivot post carried by said thimble, a second magnet on said second post, a fluid in said casing and in which the magnets are immersed, and a sleeve carried by the thimble and surrounding the second pivot post and magnet for preventing currents exteriorly thereof from affecting said second needle.

18. In a magnetic responsive device, a casing, a pivot post, a thimble pivoted on said post, a magnet on the thimble, a cap pivoted on said second post, a magnet on said cap, a pivot post carried by said cap, a terminal member carried by said last mentioned pivot post, and a sleeve carried by said float and encircling the second magnet and terminal member to prevent currents exteriorly of the sleeve from affecting said members.

19. In a magnetic responsive device, a plurality of independently pivoted magnetic units, a fluid in which said units are immersed, and a buoyancy member associated with each unit, the center of buoyancy of the magnetic units being no farther above the center of gravity of said units than is necessary to insure the system remaining in upright position.

20. In a magnetic responsive device, a plurality of independently pivoted ring magnetic units, a fluid in which said units are immersed and a buoyancy member associated with each of said units, the center of buoyancy of the units being no farther above the center of gravity of said units than is necessary to insure the system remaining in upright position.

21. In a magnetic responsive device, a pivot member, a ring magnet pivoted thereon, a second pivot member associated with said magnet, a second ring magnet pivoted on said member and means for varying the distances between said ring and a fluid within which said ring magnets are immersed and buoyancy members associated with each of said ring magnets whereby the center of gravity of said magnets is so positioned as to insure the system remaining in upright position.

22. In combination, a gimbal ring, a casing pivoted in said ring, a pair of ring magnets provided with pole pieces pivoted on a vertical axis within said casing and an electrical circuit adapted to be closed when the magnets are influenced by a magnetic mass, said casing being filled with an immersion fluid and buoyancy members associated with said magnets whereby the center of gravity of the magnets is properly positioned with respect to the pivot points.

Signed at Washington, District of Columbia, this 26th day of June, 1919.

ERNEST FOX NICHOLS.